US009494683B1

(12) United States Patent
Sadek

(10) Patent No.: US 9,494,683 B1
(45) Date of Patent: Nov. 15, 2016

(54) AUDIO-BASED GESTURE DETECTION

(71) Applicant: Amazon Technologies, Inc., Seattle, WA (US)

(72) Inventor: Ramy Sammy Sadek, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 298 days.

(21) Appl. No.: 13/920,975

(22) Filed: Jun. 18, 2013

(51) Int. Cl.
*G01S 15/00* (2006.01)
*G01S 15/04* (2006.01)

(52) U.S. Cl.
CPC .................................. *G01S 15/04* (2013.01)

(58) Field of Classification Search
CPC ....... G01S 7/8006; G01S 7/808; G01S 15/04
See application file for complete search history.

(56) References Cited

U.S. PATENT DOCUMENTS

| | | | |
|---|---|---|---|
| 3,623,097 A * | 11/1971 | Femenias | 342/128 |
| 5,923,282 A * | 7/1999 | Honma | G01S 13/20 342/118 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2001/0035087 A1 * | 11/2001 | Subotnick | 84/600 |
| 2003/0159567 A1 * | 8/2003 | Subotnick | 84/626 |
| 2008/0088508 A1 * | 4/2008 | Smith | G01S 5/06 342/453 |
| 2010/0277074 A1 * | 11/2010 | Van Endert et al. | 315/149 |
| 2010/0295782 A1 * | 11/2010 | Binder | 345/158 |
| 2012/0223885 A1 | 9/2012 | Perez | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Luke Ratcliffe
*Assistant Examiner* — Hovhannes Baghdasaryan
(74) *Attorney, Agent, or Firm* — Lee & Hayes, PLLC

(57) ABSTRACT

An audio device may be configured to detect proximity of a user hand based on analysis of audio signals captured by the audio device. For example, the audio device may be configured to perform acoustic echo cancellation based on dynamically calculated filter coefficients. The coefficients may be analyzed to determine proximity of the user hand. The proximity of the hand may be evaluated over time to detect user hand gestures.

20 Claims, 5 Drawing Sheets

AUDIO-BASED GESTURE DETECTION

BACKGROUND

Homes, offices, automobiles, and public spaces are becoming more wired and connected with the proliferation of computing devices such as notebook computers, tablets, entertainment systems, and portable communication devices. As computing devices evolve, the way in which users interact with these devices continues to evolve. For example, people can interact with computing devices through mechanical devices (e.g., keyboards, mice, etc.), electrical devices (e.g., touch screens, touch pads, etc.), and optical devices (e.g., motion detectors, camera, etc.). Another way to interact with computing devices is through audio devices that capture human speech and other sounds using microphones.

Hand gestures may be used by some devices as a way to detect user commands. Hand gestures may be detected by capturing still or video images of the user and analyzing the images to detect trajectories of hands and fingers, and by comparing the detected trajectories with reference trajectories. However, this type of analysis can be difficult to implement within the hardware constraints of many types of devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure pertains generally to an audio device having a speaker that produces audio within the environment of a user and a microphone that captures speech and other sounds from the user environment. The audio device may be configured to detect a user gesture using acoustic analysis and to respond to the user gesture by performing a function. For example, the audio device may detect the movement of the user's hand nearby the audio device and may respond by muting or unmuting the speaker output of the audio device.

In certain embodiments, the movement of the user's hand over or past the audio device, referred to herein as a hand wave or hand gesture, may be detected by analyzing the audio signal produced by the microphone. In some embodiments, the audio device may implement acoustic echo cancellation (AEC) to reduce the presence of speaker-produced audio in the audio signal produced by the microphone. In these embodiments, AEC filter coefficients may be analyzed to detect the proximity of the user's hand to the audio device, and the proximity over time may be analyzed to detect motion of the user's hand.

The audio device may be configured to implement a predefined function in response to a detected user hand gesture, such as a mute/unmute function that mutes and unmutes the audio output of the audio device. In some embodiments, different types of hand motions or trajectories may be detected by means of acoustic analysis, and different functions may be implemented in response to different types of detected gestures.

Figure 1:
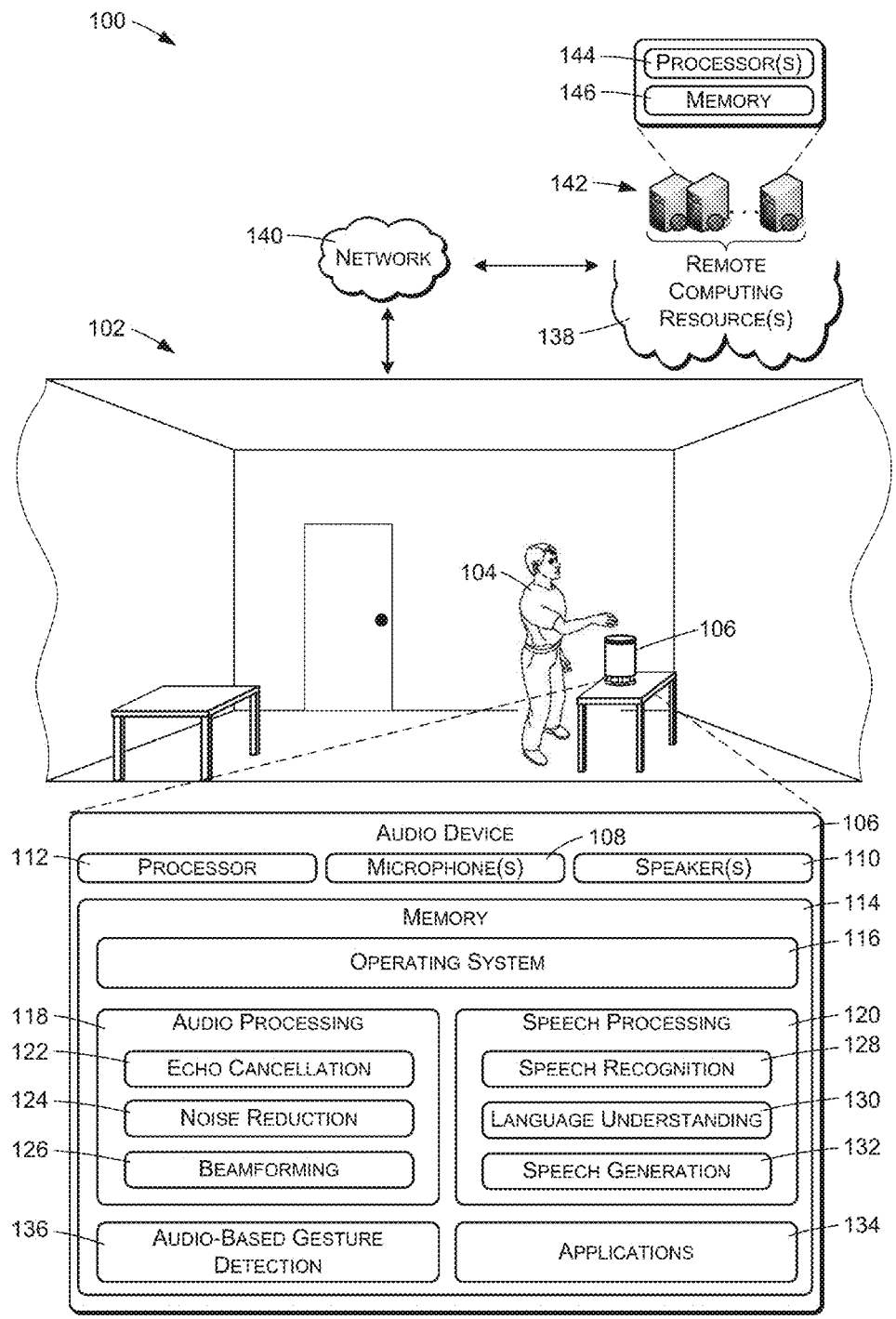
FIG. 1 is a block diagram of an illustrative voice interaction computing architecture that includes a voice-controlled audio device.

FIG. 1 shows an illustrative voice interaction computing architecture 100 set in an environment 102, such as a home environment, that includes a user 104. The architecture 100 includes an electronic, voice-controlled audio device 106 with which the user 104 may interact. In the illustrated implementation, the audio device 106 is positioned on a table within a room of the environment 102. In other implementations, it may be placed in any number of locations (e.g., ceiling, wall, in a lamp, beneath a table, under a chair, etc.). Furthermore, more than one audio device 106 may be positioned in a single room, or one audio device 106 may be used to accommodate user interactions from more than one room.

Generally, the audio device 106 may have one or more microphones 108 and one or more speakers 110 to facilitate audio interactions with the user 104 and/or other users. The microphone 108 of the audio device 106 produces an audio signal representing audio from the environment 102, such as sounds uttered from the user 104 or other noise within the environment 102. The audio signal may also contain delayed and/or reflected audio components from the speaker 110.

The audio device 106 includes operational logic, which in many cases may comprise a processor 112 and memory 114. The processor 112 may include multiple processors and/or a processor having multiple cores. The memory 114 may contain applications and programs in the form of instructions that are executed by the processor 112 to perform acts or actions that implement desired functionality of the audio device 106. The memory 114 may be a type of computer storage media and may include volatile and nonvolatile memory. Thus, the memory 114 may include, but is not limited to, RAM, ROM, EEPROM, flash memory, or other memory technology.

The audio device 106 may have an operating system 116 that is configured to manage hardware and services within and coupled to the audio device 106. In addition, the audio device 106 may include audio processing components 118 and speech processing components 120.

The audio processing components 118 may include functionality for processing input audio signals generated by the microphone(s) 108 and/or output audio signals provided to the speaker 110. As an example, the audio processing components 118 may include an acoustic echo cancellation or suppression component 122 for reducing acoustic echo generated by acoustic coupling between the microphone 108 and the speaker 110. The audio processing components 118 may also include a noise reduction component 124 for reducing noise in received audio signals, such as elements of audio signals other than user speech.

In some embodiments, the audio processing components 118 may include one or more audio beamforming components 126 that are configured to generate an audio signal that is focused in a direction from which user speech has been detected. More specifically, the beamforming components 126 may be responsive to a plurality of spatially separated microphones 108 to produce audio signals that emphasize sounds originating from different directions relative to the audio device 106, and to select and output one of the audio signals that is most likely to contain user speech.

The speech processing components 120 receive an input audio signal that has been processed by the audio processing components 118 and perform various types of processing in order to understand the intent expressed by human speech. The speech processing components 120 may include an automatic speech recognition component 128 that recognizes human speech in an audio signal. The speech processing components 120 may also include a natural language understanding component 130 that is configured to determine user intent based on recognized speech of the user.

The speech processing components 120 may also include a text-to-speech or speech generation component 132 that converts text to audio for generation by the speaker 110.

The audio device 106 may include a plurality of applications 134 that are configured to work in conjunction with other elements of the audio device 106 to provide services and functionality. The applications 134 may include media playback services such as music players. Other services or operations performed or provided by the applications 134 may include, as examples, requesting and consuming entertainment (e.g., gaming, finding and playing music, movies or other content, etc.), personal management (e.g., calendaring, note taking, etc.), online shopping, financial transactions, database inquiries, and so forth. In some embodiments, the applications may be pre-installed on the audio device 106, and may implement core functionality of the audio device 106. In other embodiments, one or more of the applications 134 may be installed by the user 104, or otherwise installed after the audio device 106 has been initialized by the user 104, and may implement additional or customized functionality as desired by the user 104.

In certain embodiments, the primary mode of user interaction with the audio device 106 is through speech. In an embodiment described herein, the audio device 106 receives spoken commands from the user 104 and provides services in response to the commands. For example, the user may speak predefined commands (e.g., "Awake"; "Sleep"), or may use a more casual conversation style when interacting with the audio device 106 (e.g., "I'd like to go to a movie. Please tell me what's playing at the local cinema."). Provided services may include performing actions or activities, rendering media, obtaining and/or providing information, providing information via generated or synthesized speech via the audio device 106, initiating Internet-based services on behalf of the user 104, and so forth.

In addition to speech input, physical user input may be detected and provided to the applications 134 by analyzing audio signals generated by the microphone 108. In particular, the audio device 106 may include an audio-based gesture detection component or module 136 that is responsive to input and output audio signals to detect proximity of a user hand or other object relative to the audio device 106, and/or to detect gestures or other movements based on audio analysis of the input and/or output audio signals. When a gesture is detected, the audio-based gesture detection component 136 indicates to the operating system 116 and/or the applications 134 that a user input gesture event has occurred, and the applications or other elements of the audio device 106 may respond accordingly. Specific techniques for audio-based gesture detection will be described in more detail with reference to FIGS. 2-4.

In some instances, the audio device 106 may operate in conjunction with or may otherwise utilize computing resources 138 that are remote from the environment 102. For instance, the audio device 106 may couple to the remote computing resources 138 over a network 140. As illustrated, the remote computing resources 138 may be implemented as one or more servers or server devices 142. The remote computing resources 138 may in some instances be part of a network-accessible computing platform that is maintained and accessible via a network 140 such as the Internet. Common expressions associated with these remote computing resources 138 may include "on-demand computing", "software as a service (SaaS)", "platform computing", "network-accessible platform", "cloud services", "data centers", and so forth.

Each of the servers 142 may include processor(s) 144 and memory 146. The servers 142 may perform various functions in support of the audio device 106, and may also provide additional services in conjunction with the audio device 106. Furthermore, one or more of the functions described herein as being performed by the audio device 106 may be performed instead by the servers 142, either in whole or in part. As an example, the servers 142 may in some cases provide the functionality attributed above to the speech processing components 120. Similarly, one or more of the applications 134 may reside in the memory 146 of the servers 142 and may be executed by the servers 142.

The audio device 106 may communicatively couple to the network 140 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 140 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

Although the audio device is described herein as a voice-controlled or speech-based interface device, the techniques described herein may be implemented in conjunction with various different types of devices, such as telecommunications devices and components, hands-free devices, entertainment devices, media playback devices, and so forth.

Figure 2:
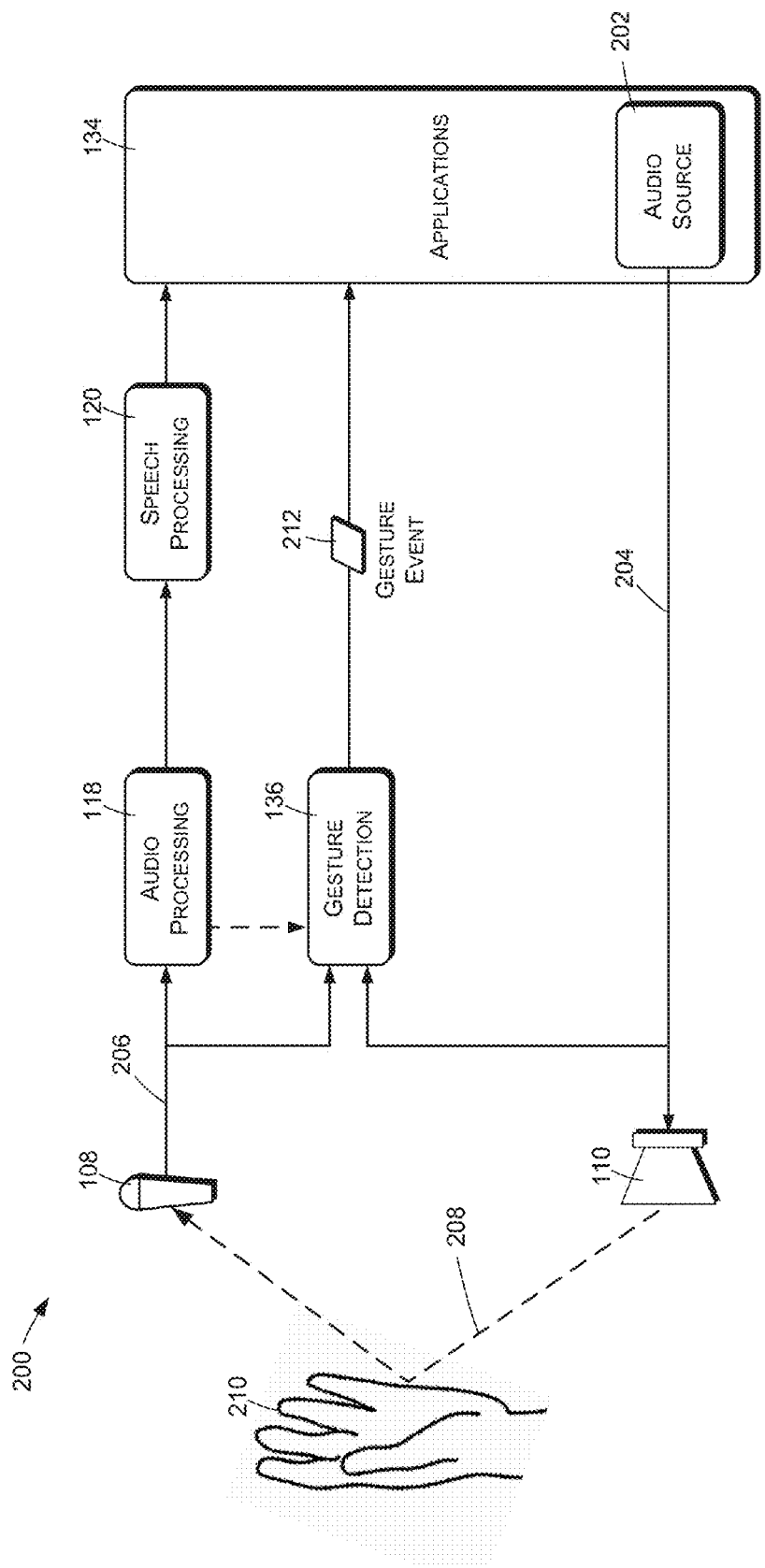
FIGS. 2 and 3 are a block diagrams illustrating examples of audio-based gesture detection.

FIG. 2 illustrates an example 200 of audio-based gesture detection such as might be performed in conjunction with the architecture described above. An audio source 202 generates an output audio signal 204 that is provided to the speaker 110. The audio source 202 may comprise or may be part of one of the applications 134 as shown in FIG. 2, or may comprise an independent or external source. The speaker 110 is responsive to the audio source 202 and the output audio signal 204 to produce audio within the user environment 102. Various types of filtering, processing, and/or amplification may be provided between the audio source and the speaker 110.

The microphone 108 receives audio from the user environment 102 and generates an input audio signal 206 that represents the audio. The received audio may include user speech and ambient noise, and may also include acoustic feedback, echo, or other audio components resulting from audio that is generated by the speaker 110.

FIG. 2 illustrates a reflective acoustic path 208 that may be generated by a reflective surface such as a user hand 210 that is in proximity to the audio device 106. Audio generated by the speaker 110 is projected into the environment and is reflected by the user hand 210 back to the microphone 108. This reflection or echo is captured by the microphone 108 along with other audio within the environment 102.

Although FIG. 2 shows only a single reflective path 208, the environment may contain multiple reflective paths, resulting from multiple reflective surfaces within the environment 102. Furthermore, a direct acoustic path (not shown) typically exists between the speaker 110 and the microphone 108. Thus, the input audio signal 206 may have multiple echo components, which may be the result of both direct and reflective acoustic paths.

The input audio signal 206 may be processed by the audio processing components 118 and the speech processing components 120. Speech-related information gathered or understood from the input audio signal 206 may be provided to the applications 134. The applications 134, as described above, may respond by providing services or performing actions.

The gesture detection component 136 may be responsive to the output audio signal 204, the input audio signal 206, and/or information received from the audio processing components 118 to determine and/or monitor the proximity of the user hand 210 relative to the microphone 108 and/or speaker 110. Various analytical techniques may be used for this purpose. In an embodiment described below with reference to FIG. 3, parameters generated by the audio processing components 118 are used to detect proximity of the user hand 210. More specifically, filter coefficients of the echo cancellation component 122 are analyzed to detect hand proximity.

Different analytical techniques may be used in other environments, based on the input audio signal 206 and the output audio signal 204. For example, the gesture detection component 136 may be configured to detect flanging of the input audio signal 206 relative to the output audio signal 204. Flanging is a signal effect that results from two combined audio signals, where the audio signals are nearly identical other than having a slight and varying time delay. In order to detect flanging in the input signal 206, the gesture detection component 136 may generate one or more flanged signals based on the output signal 204, and may then compare the generated flanged signals to the input signal 206 to determine whether the input signal 206 exhibits flanging characteristics.

As another example, the gesture detection component 136 may be configured to analyze frequency components of the input audio signal 206 relative to the output audio signal 204 to detect proximity of the user hand 210. Low frequencies will tend to increase relative to high frequencies, in comparison to the output signal 204, when the user hand 210 is near the microphone 108. Presence of such low frequencies may be used to detect proximity of the user hand.

The gesture detection component 136 may be configured to declare a user input or gesture event 212 to the applications 134 based on different detected conditions relating to detected placement and/or movement of the user's hand. In some embodiments, placing a hand over or near the audio device 106 may immediately generate the gesture event 212. In other embodiments, the gesture detection component 136 may declare a user input or gesture event 212 after the hand 210 has been placed near the audio device 106 for a predetermined time, such as 2 or 3 seconds. In yet other embodiments, the gesture detection component 136 may be configured to detect motion of the user hand 210, and may declare the gesture event 212 when detecting motion of the user hand 210 toward and then away from the audio device 106. In certain embodiments, particularly in audio devices having multiple microphones, it may be possible to determine the direction of hand movement relative to the audio device, and to declare different gesture events 212 depending on the direction of hand movement. Depending on the complexity of the gesture detection component 136, three-dimensional positions of the hand 210 may be monitored over time and compared to predefined trajectories in order to detect and distinguish between different types of hand gestures. In some cases, machine learning may be used to classify different types of gestures. For example, different type of motions may be learned and distinguished, such as a motion of reaching near a device, picking a device up, etc.

Figure 3:
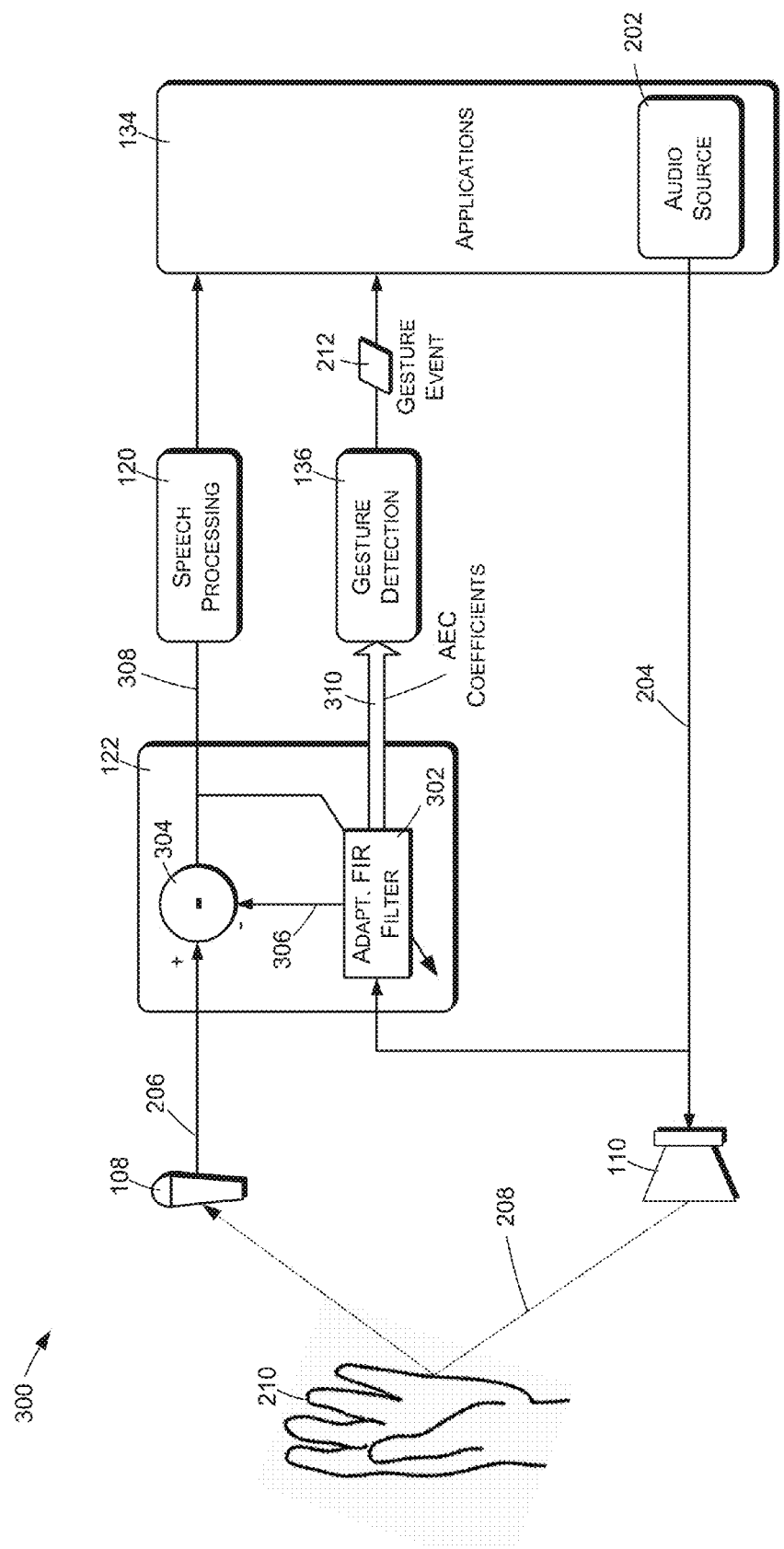

FIG. 3 shows an example 300 of audio-based gesture detection that is based on acoustic echo cancellation (AEC) such as might be performed in the input audio processing components of an audio device. As in FIG. 2, the audio source 202 generates an output audio signal 204, which is provided to the speaker 110. The microphone 108 receives audio from the user environment and produces an input audio signal 206 that may include acoustic reflections or echoes resulting from the reflective acoustic path 208 associated with the user hand 210.

Various audio processing components may be used to process the input audio signal 206 in accordance with various design objectives. In the example of FIG. 3 only the echo cancellation component 122 is shown, although it should be understood that other components may also be used. For example, various types of noise suppression, beamforming, and other audio processing may be implemented either upstream or downstream of the echo cancellation component 122. Furthermore, although FIG. 3 illustrates a particular type of echo cancellation based on adaptive filtering, alternative echo cancellation techniques may be used in conjunction with the described gesture detection.

The echo cancellation component 122 receives the input audio signal 206 and the output audio signal 204, which is referred to as a reference signal in the AEC environment. The AEC component is configured to cancel or suppress acoustic echo in the input audio signal 206.

In the described embodiment, the echo cancellation component 122 may implement, for example, an adaptive filter, using an adaptive finite impulse response (FIR) filter 302 and a subtraction component 304. The adaptive FIR filter 302 generates an estimated echo signal 306, which estimates one or more echo components of the input audio signal 206 resulting from acoustic transmission from the microphone 108 to the speaker 110. The estimated echo signal 306 is subtracted from the input audio signal 206 by the subtraction component 304 to produce an echo-cancelled input audio signal 308. The echo-cancelled input audio signal 308 is provided to the speech processing components 120. The speech processing components 120 produce speech-related information based on the input audio signal 308 and provide the speech-related information to the applications 134.

The adaptive FIR filter 302 estimates undesired echo by generating and repeatedly updating a sequence of coefficients 310, which are also referred to herein as cancellation parameters or filter parameters, and by applying the coefficients 310 respectively to a sequence of most recently received samples of the input audio signal 206. The adaptive FIR filter 302 calculates and dynamically updates the coefficients 310 so as to continuously and adaptively minimize the signal power of the echo-cancelled audio signal 308, which is referred to as the "error" signal in the context of adaptive filtering.

The gesture detection component 136 is configured to analyze the coefficients 310 to detect gestures. The AEC coefficients 310 are generated as a sequence, where each coefficient of the sequence corresponds to a respective distance from the audio device. The relative positions of peak coefficients in the sequence and the amplitudes of the peak coefficients indicate the prominence and distance of reflective surfaces relative to the audio device 106. Accordingly, positional changes and/or amplitude changes of the coefficient peaks may be detected by the gesture detection component 136 to detect gestures. In some cases, machine learning techniques may be used to learn coefficient patterns that represent gestures. In other cases, relatively rapid changes in coefficient values or patterns may be used as indications of user gestures. The gesture detection component 136, may also use machine learning in other ways, such as by learning patterns in the echo-cancelled input audio signal 308.

In certain embodiments, the gesture detection component 136 may be configured to analyze the coefficients 310 to detect the locations of reflective surfaces. In particular, the gesture detection component 136 may be configured to repeatedly evaluate and/or detect the proximity and/or motion of the hand 210 relative to the audio device 106 based on analysis of the AEC coefficients 310, and to generate or provide the gesture event 212 based at least in part on the proximity and/or motion of the hand 210 relative to the audio device 106.

More particularly, the gesture detection component 136 may be configured to analyze the sequence of filter coefficients 310 to identify peaks in the coefficient values, which correspond to echo sources or reflective surfaces. The relative positions of the peak coefficients in the sequence and the amplitudes of the peak coefficients are used by the gesture detection component 136 to determine the prominence and distance (e.g., approximated by using the speed of sound) of reflective surfaces relative to the audio device 106. For example, the gesture detection component 136 may detect a first proximity of an object based on a first set of corresponding to a first time, subsequently detect a second proximity of the object based on a second set of corresponding to a second time, and declare a gesture event when the first and second proximities indicate that the object near the device and moving toward the device. More generally, the presence of a near reflection that is moving closer to the audio device over time may be used as an indication of a hand gesture.

In a particular embodiment, the first coefficient peak in a given set of coefficients may correspond to a direct acoustic path between the microphone 108 and the speaker 110. The second detected peak may correspond to an echo resulting from a first reflective surface, such from the reflective surface that is nearest to the audio device 106. The audio device 106 may monitor the distance of the second detected peak over time as an indication of proximity of the user hand 210. The gesture event 212 may therefore be declared and provided to the applications 134 based on the monitored proximity of the user hand 210, based on the position of the second detected peak in the sequence of AEC coefficients 310.

Other factors may also, or alternatively, be used to detect object motion and to declare a gesture event. For example, the rate of change of the coefficients 310 may be monitored to detect gesture. As another example, AEC coefficients generated from multiple audio signals, corresponding to different microphones may be analyzed as described above to determine motion of an object.

Figure 4:
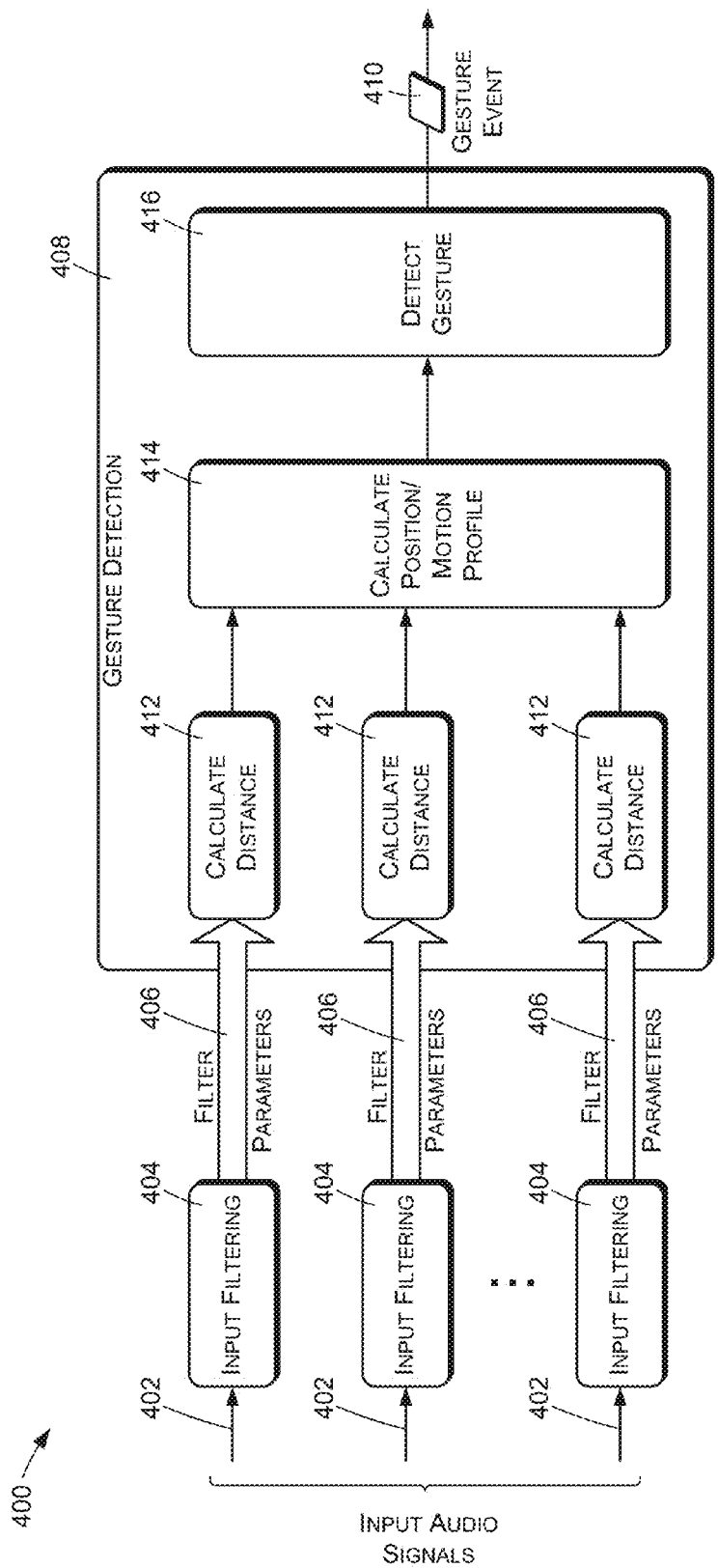
FIG. 4 is a block diagram illustrating an example process and configuration for detecting user gestures using audio analysis.

FIG. 4 illustrates an example of a method 400 that may be implemented by an audio device to detect user gestures. In this example, it is assumed that the audio device generates or receives a plurality of input audio signals 402. The multiple input audio signals 402 may, for example, correspond to multiple directionally-focused audio channels that may be produced by an audio beamformer such as the beamforming components 126 of FIG. 1. Alternatively, the input audio signals 402 may correspond to left and right channels of a stereo input signal.

An action 404, performed with respect to each of the multiple input audio signals 402, may comprise filtering the input audio signals 402. The input filtering 404 may comprise adaptive acoustic echo cancellation (AEC) such as described above, to cancel acoustic echo in the input audio signals 402.

The input filtering 404 may be based on a reference signal such as an output audio signal. The input filtering 404 may utilize or generate sets of filter parameters 406 corresponding respectively to each of the input audio signals 402. Each set of filter parameters 406 may comprise coefficients of an adaptive finite impulse response (FIR) filter as described above.

The filter parameters 406 are received by a classifier 408 which functions generally to detect proximity of a user hand or other object, to evaluate the proximity over time, and to declare a gesture event 410 in response to a particular type of movement.

The classifier 408 may be configured to perform an action 412 with respect to each set of filter parameters 406. The action 412 may comprise calculating the distance of the nearest reflective surface based on the filter parameters 306. As described above, this may involve identifying peaks within the filter parameters 406 and correlating those peaks to distances relative to the microphones of the audio device. The actions 412 produce measurements of distances with respect to each microphone of the audio device.

The classifier may be further configured to perform an action 414, comprising receiving the distance measurements and calculating a position and/or motion profile representing the position of a user hand or other object over time, based on the distance measurements. The action 414 may comprise repeatedly evaluating the proximity of the user hand to determine motion of the user hand.

In some embodiments, and depending on the number of available input audio signals 402, positions may be specified relative to each other, in two or three dimensions. In some embodiments, for example, distance measurements produced from different input audio signals may be used in combination to determine relative three-dimensional positions of a user hand over time.

An action 412 comprises detecting a user gesture based on the calculated position or motion profile produced by the action 410, and declaring or outputting a user input or gesture event 414 when a gesture is detected. The detecting may comprise evaluating the calculated position or motion profile to determine whether it meets predefined criteria defining a gesture. For example, position or motion profiles may be compared to predefined reference profiles and/or learned profiles to determine whether movement of a user hand qualifies as a gesture. The gesture event 212 may be provided to elements of the audio device, and may be used to control functions or functionality of the audio device.

Figure 5:
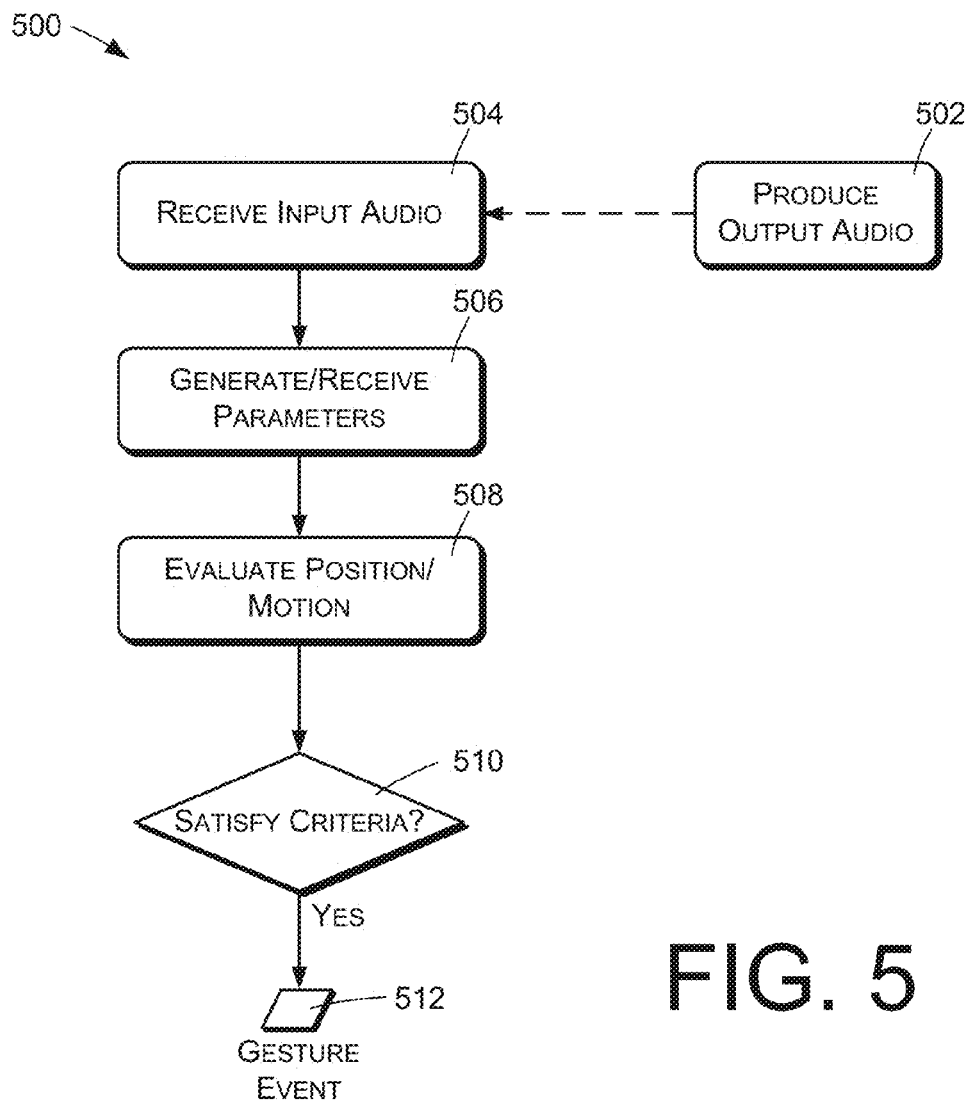
FIG. 5 is a flow diagram illustrating an example method for detecting user gestures using audio analysis.

FIG. 5 illustrates a method 500 that may be implemented in various environments and devices to detect a hand gesture. An action 502 comprises generating or producing output audio in an environment such as a room. An action 504 comprises receiving input audio 504 from the environment. The received input audio may include components of the output audio, including a echo of the output audio due to acoustic coupling and an audio reflection from the hand of a user.

An action 506 may comprise generating and/or receiving filter parameters, such as parameters generated and/or used by an acoustic echo cancellation component. In some embodiments, the parameters may comprise coefficients of a linear FIR filter.

An action 508 may comprise evaluating position and/or motion of an object based on the filter parameters generated or received in the action 506. The action 508 may comprise monitoring the filter parameters to detect changes, or may comprise more complex analysis such as detecting relative positions of a nearby object over time, based on the filter parameters.

An action 510 may comprise comparing the detected position and/or motion of the object to predefined criteria. If the criteria are satisfied, a gesture event 512 is generated. The predefined criteria may specify a particular type of motion or proximity, or may specify a particular motion profile. The criteria may be specified in terms of position, proximity, motion, speed, etc.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. An audio device, comprising:
a speaker configured to generate output audio based at least in part on an output audio signal;
a microphone configured to produce an input audio signal, wherein the input audio signal contains one or more acoustic echoes of the output audio;
an acoustic echo cancellation element configured to:
receive the input audio signal;
dynamically update a sequence of acoustic echo cancellation (AEC) coefficients to estimate the one or more acoustic echoes of the output audio, wherein a first one of the AEC coefficients corresponds to a first distance from the audio device and a second one of the AEC coefficients corresponds to a second distance from the audio device; and
a gesture detection element configured to:
receive, from the acoustic echo cancellation element, the sequence of AEC coefficients;
detect a first proximity of an object to the audio device based at least in part on relative positions of the AEC coefficients within the sequence and amplitudes of a least a portion of the AEC coefficients in the sequence within a first set of the sequence of AEC coefficients corresponding to a first time;
detect a second proximity of the object to the audio device based at least in part on relative positions of the AEC coefficients within the sequence and amplitudes of the least a portion of the AEC coefficients in the sequence within a second set of the sequence of AEC coefficients corresponding to a second time; and
declare a gesture event when the first proximity of the object to the audio device and the second proximity of the object to the audio device indicate that the object is near the audio device and moving toward the audio device.

2. The audio device of claim 1, wherein the audio device is configured to mute and unmute the output audio in response to a mute gesture event.

3. The audio device of claim 1, wherein the gesture detection element detects the first proximity and the second proximity by identifying AEC coefficients from the first and second sets that correspond to an acoustic reflection of the output audio.

4. The audio device of claim 1, wherein the gesture detection element is further configured to detect motion of the object based at least in part on the sequence of AEC coefficients and to generate the gesture event based at least in part on the motion of the object.

5. The audio device of claim 1, wherein the acoustic echo cancellation element comprises an adaptive finite impulse response filter.

6. The audio device of claim 1, further comprising a plurality of microphones.

7. A method comprising:
receiving, from a microphone, an input audio signal that includes an acoustic echo generated, at least in part, on acoustic coupling between the microphone and a speaker and a position of an object;
updating a sequence of acoustic echo cancellation (AEC) parameters to cancel at least a portion of the acoustic echo in the input audio signal, wherein the AEC parameters include a first parameter related to a first distance from the object and a second parameter related to a second distance from the object; and
evaluating the AEC parameters to determine proximity of the object relative to one or more of the microphone or the speaker, wherein evaluating the AEC parameters includes detecting a positional change of one or more of the AEC parameters within the sequence.

8. The method of claim 7, wherein the parameters comprise a dynamically updated sequence of AEC filter parameters, and wherein the evaluating comprises identifying one or more of the AEC filter parameters that correspond to the acoustic echo.

9. The method of claim 7, further comprising declaring a user input event based at least in part on the determined proximity of the object.

10. The method of claim 7, further comprising muting or unmuting an audio device based at least in part on the determined proximity of the object.

11. The method of claim 7, further comprising controlling an audio device based at least in part on the determined proximity of the object.

12. The method of claim 7, wherein the cancelling uses an adaptive filter and wherein the AEC parameters comprise AEC coefficients that are dynamically updated by the adaptive filter.

13. The method of claim 7, further comprising repeatedly evaluating the proximity of the object to determine motion of the object.

14. The method of claim 7, further comprising:
repeatedly evaluating the proximity of the object to determine motion of the object; and
declaring a user input event based at least in part on the determined motion of the object.

15. One or more non-transitory computer-readable media storing computer-executable instructions that, when executed by one or more processors, cause the one or more processors to perform acts comprising:
causing output audio to be produced;
causing an input audio signal to be produced that contains one or more components of the output audio; and
comparing the input audio signal to the output audio to detect proximity of an object relative to one or more of a microphone or speaker based, at least in part, on detection of a flanging of the input audio signal relative to the output audio.

16. The one or more non-transitory computer-readable media of claim 15, wherein the comparing comprises adjusting one or more parameters to cancel at least a portion of acoustic echo in the input audio signal.

17. The one or more non-transitory computer-readable media of claim 15, wherein the comparing comprises estimating an audio echo component of the input audio signal, wherein the audio echo component is based at least in part on an acoustic reflection of the output audio by the object.

18. The one or more non-transitory computer-readable media of claim 15, further comprising generating flanged signals based at least in part on the output audio and comparing the flanged signals to the input audio signal.

19. The one or more non-transitory computer-readable media of claim 15, the acts further comprising declaring a user interface event in response to the detected proximity of the object.

20. The one or more non-transitory computer-readable media of claim 15, the acts further comprising controlling an audio device based at least in part on the detected proximity of the object.

* * * * *